(No Model.) 2 Sheets—Sheet 1.
G. C. BLICKENSDERFER.
CONVEYER APPARATUS.
No. 338,704. Patented Mar. 30, 1886.
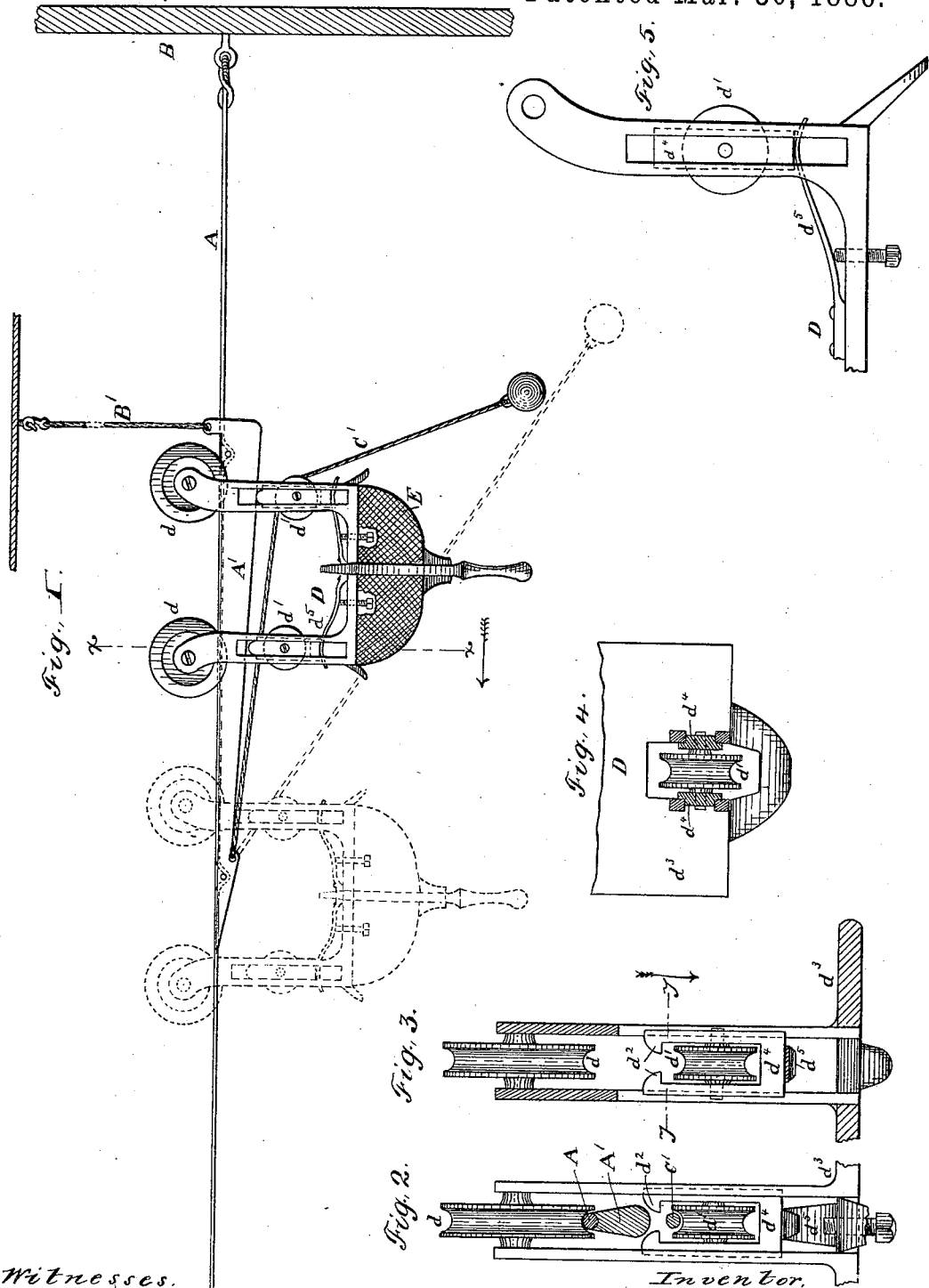
Witnesses.
Robt. H. Porter.
L. D. Hanford.
Inventor.
Geo. C. Blickensderfer,
Per Hallock & Hallock
Att's (No Model.) 2 Sheets—Sheet 2.
G. C. BLICKENSDERFER.
CONVEYER APPARATUS.
No. 338,704. Patented Mar. 30, 1886.
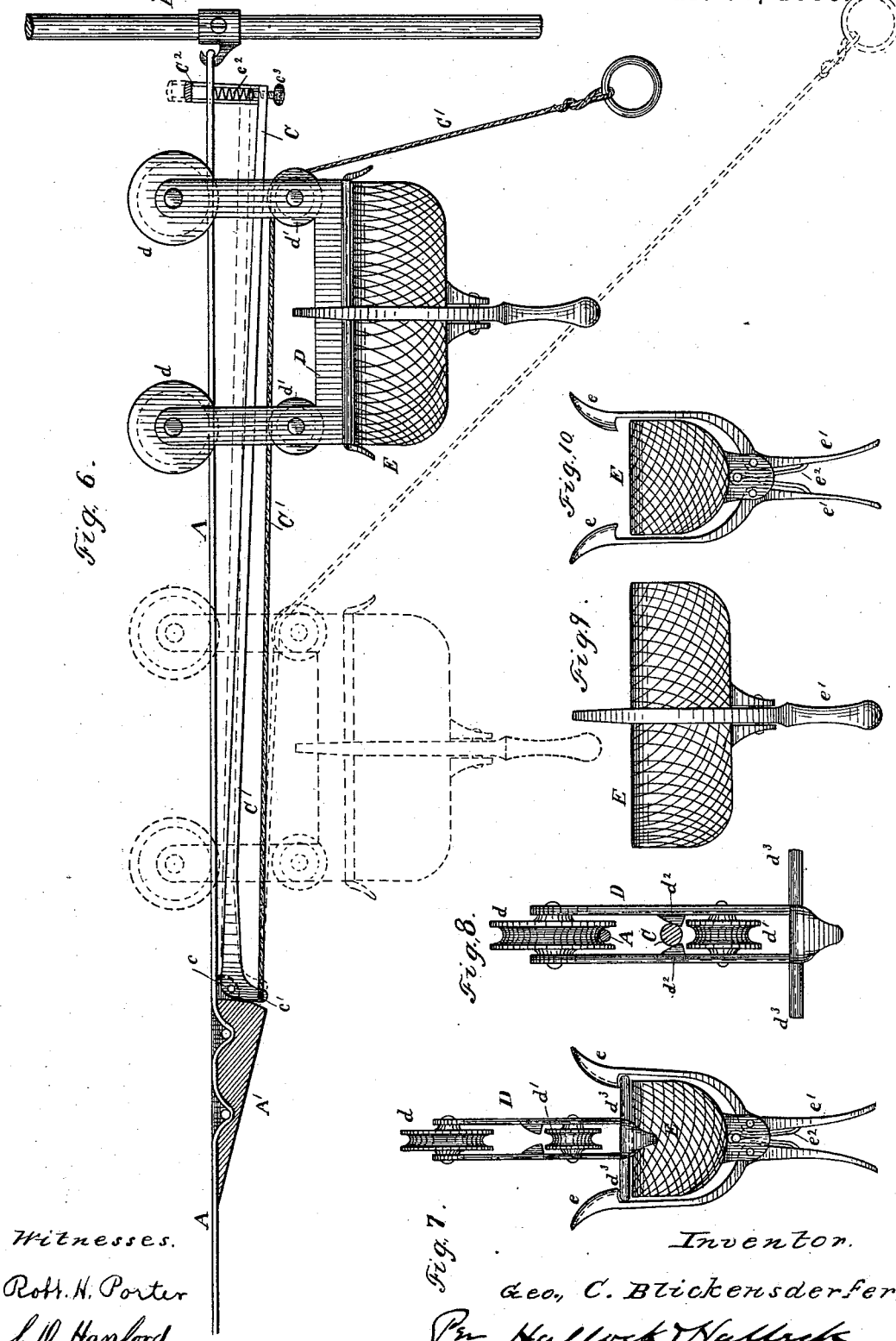
Witnesses.
Robt. H. Porter
L. D. Hanford
Inventor.
Geo. C. Blickensderfer.
Per Hallock & Hallock
Att's

UNITED STATES PATENT OFFICE.

GEORGE C. BLICKENSDERFER, OF ERIE, PENNSYLVANIA.

CONVEYER APPARATUS.

SPECIFICATION forming part of Letters Patent No. 338,704, dated March 30, 1886.

Application filed October 26, 1885. Serial No. 180,968. (No model.)

*To all whom it may concern:*

Be it known that I, GEORGE C. BLICKENSDERFER, a citizen of the United States, residing at Erie, in the county of Erie and State of Pennsylvania, have invented certain new and useful Improvements in Conveyer Apparatus; and I do hereby declare the following to be a full, clear, and exact description of the invention, such as will enable others skilled in the art to which it appertains to make and use the same.

This invention relates to carrier devices for store and other like service; and it consists in certain improvements in the construction thereof, as will be hereinafter fully set forth and claimed.

My device is illustrated in the accompanying drawings, as follows:

Figure 1 is a side elevation of a track, a car on the track, means for stopping the car at the end of the track, and the means for dispatching a car from a station. Fig. 6 is a similar view showing an alternative construction. Fig. 2 is an end view of the trolley of the carriage with the track in section. Fig. 3 is a vertical section through the frame of the trolley on the line $x\ x$ in Fig. 1. Fig. 4 is a transverse section on the line $y\ y$ in Fig. 3. Fig. 5 is a side view of one end of the trolley-frame. Fig. 7 is an end view of the car shown in Fig. 6. Fig. 8 is an end view of the trolley of a car with the basket removed, and on somewhat larger scale than in Fig. 7. Fig. 9 is a side view of the basket detached from the trolley. Fig. 10 is an end view of the basket detached from the trolley.

A is the track.

B is the object to which the track is attached, being a wall, or a post, or any other fixture.

B' is a supporting-stay, connected with the ceiling.

A' is a clip on the track at the station. In Fig. 1 this clip is shown to be long and tapered, so as to form a wedge to stop the car, while in Fig. 6 it is short, but has a pivoted rod, C, connected with it and extending back under the track to form a wedge to stop the car.

D is the trolley of the car, $d\ d$ being the wheels and $d'\ d'$ being two sheaves in the trolley-frame below the track. The trolley-frame, it will be seen, embraces the track, so that the trolley can not be thrown from the track under any circumstances.

In the construction shown in Figs. 1, 2, 3, 4, and 5, the sheaves $d'\ d'$ are journaled in blocks $d^4\ d^4$, which slide in ways in the trolley-frame, and a spring, $d^5$, gives them a vertically-yielding action in the trolley-frame. On the inside of each of these blocks $d^4$ are two lugs, $d^2$, which project toward each other, but do not meet. These lugs come in contact with the clip A' when the car runs onto it, and thus the car is stopped, and as this occurs the spring $d^5$ yields and the act of stopping is effected without jar or reaction. In the construction shown on Sheet 2 the sheaves $d'$ are not journaled in yielding blocks, but in the frame of the trolley, and the lugs $d^2$ are on the frame of the trolley.

The yielding action necessary to effect a gentle stopping of the car is obtained by the bar C being pivoted and provided with a spring, $c^2$, in the stirrup $C^2$ at its free end.

C' is a cord, (or, of course, it may be a chain or a single pliable wire,) which is suspended from and hangs pendent under the track. In Fig. 1 it is shown attached to the clip A', and in Fig. 6 it is shown as attached to the short arm of the lever or rod C. When the car passes this cord in running into a station, the cord is threaded into the frame of the trolley, passes between the lugs $d^2\ d^2$, and lies on one of the sheaves $d'$, as is clearly seen in Figs. 1 and 6.

When the construction is as shown in Fig. 1 and the car is in the position there shown in full lines, it is evident that if the cord C' is pulled it will draw the sheave down, depressing the spring $d^5$ and freeing the lugs $d^2$ from the clip A', thus leaving the car free to move, and the cord will force the car back out of the station onto the track A. In fact the action will be such, if the cord is pulled sharply, as to give the car sufficient impetus to propel it along a level track a considerable distance.

When the construction is as shown in Fig. 6, the pulling on the cord will raise the free end of the rod C, and thus free the car, and it will be impelled back onto the track A. This method of impelling the car can be used on short lines to great advantage.

The tracks will be preferably level, and will be provided at each end with the devices shown in Fig. 1, (or 6, as the case may be.) There will be no intermediate stations and no obstructions along the track, and the cars can be easily made to run fully one hundred feet, if desired, by the proper manipulation of the impelling-cord $C'$.

I am aware that carrier devices have been made in which the car is impelled from a station by pulling a cord, which the car has gathered up as it entered the station. See, for example, Patent No. 326,130, dated September 15, 1885, where it will be observed the cord lies across the track and is supported on pulleys on side pieces or outriggers, and as the car enters the station it doubles up the cord. My device, it will be seen, differs very greatly from this. It is much simpler, as the outriggers are dispensed with, and the strain caused by dispatching a car is endwise on the track and vertically against the suspending-stay $B'$, and thus no lateral bracing is required, as where the strain incident to pulling the cord is transverse the track, as in the patent cited.

The manner of attaching the basket to the trolley is shown clearly in Figs. 7, 8, 9, and 10, and is as follows: The trolley is provided at the lower end of its frame with a plate, $d^3$, which serves as a cover to the basket. The basket is provided with a pair of spring-grippers, $e$ $e$, with handles $e'$ $e'$ on the under side of the basket, which may be gripped by the hand and operated like a pair of pinchers or tongs. The grippers $e$ $e$ catch over the plate $d^3$. By pressing two handles, $e'$, together, the grippers will be thrown out beyond the plate, and the basket can be removed.

What I claim as new is—

1. In a conveyer apparatus, the combination of a track, a wedge-formed extension below the track, a cord hanging below the track, a car embracing said track and provided with lugs to engage said wedge, and a sheave on the car below the track to receive said cord, substantially as and for the purposes mentioned.

2. In a conveyer apparatus, the combination of a track, a wedge-formed extension below the track, a cord hanging below the track, a car embracing said track, a sheave mounted on a block which slides vertically in the frame of said car below the track and receives said cord, a spring for supporting said sliding block, and lugs on said sliding block above the sheave for engaging said wedge-formed extension from the track, substantially as and for the purposes set forth.

3. In a conveyer apparatus, the combination of a track or wedge-formed extension below the track, a cord hanging below the track, a carriage movable on said track and having in its frame below the track a yielding block which will bind upon said wedge-formed extension, and a sheave in said yielding block to receive the hanging cord, substantially as and for the purposes set forth.

4. In a conveyer apparatus, the combination of a track, a trolley movable on said track, which is provided with a lateral extension, $d^3$, below the track, and a receptacle, E, having grippers $e$ $e$ above the receptacle to engage said extension, and handles $e$ $e'$ for operating said grippers and handling said receptacle, which extend below the said receptacle.

In testimony whereof I affix my signature in presence of two witnesses.

GEORGE C. BLICKENSDERFER.

Witnesses:
JNO. K. HALLOCK,
ROBT. H. PORTER.